US012379983B2

(12) United States Patent
Schlichting et al.

(10) Patent No.: US 12,379,983 B2
(45) Date of Patent: Aug. 5, 2025

(54) TRAINING AND USING A MEMORY FAILURE PREDICTION MODEL

(71) Applicant: Microsoft Technology Licensing, LLC, Redmond, WA (US)

(72) Inventors: Jasmine Grace Schlichting, Seattle, WA (US); Bhuvan Malladihalli Shashidhara, Bellevue, WA (US); Ramakoti R. Bhimanadhuni, Bothell, WA (US); Emily Nicole Wilson, Seattle, WA (US); Farah Farzana, Redmond, WA (US); Michael Wayne Stephenson, Woodinville, WA (US); Pallavi Baral, Redmond, WA (US); Josh Charles Moore, Lynnwood, WA (US); Christina Margaret Tobias, Seattle, WA (US); John A. Strange, Everett, WA (US); Peter Hanpeng Jiang, Kirkland, WA (US); Sebastien Nathan R Levy, Seattle, WA (US); Brett Kenneth Dodds, Boise, ID (US); Arhatha Bramhanand, Redmond, WA (US); Juan Arturo Herrera Ortiz, Seattle, WA (US); Ahu Oral, Seattle, WA (US); Charlotte Gauchet, Redmond, WA (US); Daniel Sebastian Berger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 930 days.

(21) Appl. No.: 17/531,158

(22) Filed: Nov. 19, 2021

(65) Prior Publication Data

US 2023/0161655 A1    May 25, 2023

(51) Int. Cl.
  *G06F 11/07*    (2006.01)
  *G06F 18/214*   (2023.01)
  (Continued)

(52) U.S. Cl.
  CPC ........ *G06F 11/073* (2013.01); *G06F 11/0757* (2013.01); *G06F 11/0772* (2013.01);
  (Continued)

(58) Field of Classification Search
  CPC ............... G06F 11/073; G06F 11/0757; G06F 11/0772; G06F 18/214; G06F 11/0766;
  (Continued)

(56) References Cited

U.S. PATENT DOCUMENTS 11,561,868 B1 *  1/2023  Poornachandran ... G06F 11/165
11,609,810 B2 *  3/2023  Alt ........................ G06F 3/0653
(Continued)

FOREIGN PATENT DOCUMENTS

CN       111078479 A      4/2020

OTHER PUBLICATIONS

Du, et al., "Fault-Aware Prediction-Guided Page Offlining for Uncorrectable Memory Error Prevention", In IEEE 39th International Conference on Computer Design, Oct. 24, 2021, pp. 456-463.
(Continued)

*Primary Examiner* — Albert Decady
*Assistant Examiner* — Osman M Alshack
(74) *Attorney, Agent, or Firm* — Workman Nydegger

(57) ABSTRACT

The disclosure herein describes training and using an uncorrectable error (UE) state prediction model based on telemetry error data. Sets of UE state labels and non-UE state labels are generated from a first set of collected telemetry data, wherein the UE state labels each reference a UE and telemetry data of an interval prior to the referenced UE. Statistical features are extracted from telemetry data of the
(Continued)

sets of UE state labels and non-UE state labels, and the extracted statistical features are used to train a UE state prediction model. A second set of collected telemetry data is obtained, and a UE event is predicted based on the second set of collected telemetry data using the trained UE state prediction model. A preventative operation is performed on a memory page of the system based on the predicted UE event, whereby the predicted UE event is prevented from occurring.

20 Claims, 7 Drawing Sheets

(51) Int. Cl.
*G06N 3/008* (2023.01)
*G06N 20/00* (2019.01)

(52) U.S. Cl.
CPC .......... *G06F 18/214* (2023.01); *G06N 3/008* (2013.01); *G06N 20/00* (2019.01)

(58) Field of Classification Search
CPC ............. G06F 11/3058; G06F 11/0793; G06F 11/3037; G06F 11/008; G06N 3/008; G06N 20/00
USPC .................................................. 714/723, 764
See application file for complete search history.

(56) References Cited

U.S. PATENT DOCUMENTS

| | | | |
|---|---|---|---|
| 2019/0147364 A1* | 5/2019 | Alt | G06N 7/01 706/12 |
| 2020/0043529 A1* | 2/2020 | Shabbir | G06F 1/206 |
| 2022/0129171 A1* | 4/2022 | Karr | G06F 3/0683 |
| 2023/0083193 A1* | 3/2023 | Zhou | G06F 11/073 714/42 |
| 2023/0161655 A1* | 5/2023 | Schlichting | G06F 11/008 706/21 |

OTHER PUBLICATIONS

Giurgiu, et al., "Predicting DRAM Reliability in the Field with Machine Learning", In Proceedings of the 18th ACM/IFIP/Usenix Middleware Conference on Industrial Track, Dec. 1, 2017, pp. 15-21.
"International Search Report and Written Opinion Issued in PCT Application No. PCT/US22/042576", Mailed Date: Dec. 3, 2022, 13 Pages.
"featurewiz", Retrieved from: https://github.com/AutoViML/featurewiz, Nov. 29, 2020, 15 Pages.
Hudek, Ted, "How WHEA Performs PFA on ECC Memory", Retrieved from: https://docs.microsoft.com/en-us/windows-hardware/drivers/whea/how-whea-performs-pfa-on-ecc-memory, Dec. 8, 2020, 2 Pages.
Lundberg et al., "SHAP", Retrieved from: https://github.com/slundberg/shap, Mar. 4, 2021, 22 Pages.

* cited by examiner

TRAINING AND USING A MEMORY FAILURE PREDICTION MODEL

BACKGROUND

Memory hardware failures, including uncorrectable errors (UEs), have a detrimental effect on reliability of hardware and software. UEs are hardware error conditions that are not capable of correction by hardware or firmware. For example, UEs are one of the leading cases of hardware-related virtual machine reboots in cloud computing platforms. Such UE-caused reboots deteriorate the customer experience. However, mitigation of UEs presents significant challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training and using an uncorrectable error (UE) state prediction model based on telemetry error data is described. Sets of UE state labels and non-UE state labels are generated from a first set of collected telemetry data. Statistical features are extracted from telemetry data of the sets of UE state labels and non-UE state labels. The labels and the extracted statistical features are used to train a UE state prediction model. Once the model is trained, a second set of collected telemetry data is obtained and a UE event is predicted based on the second set of collected telemetry data using the trained UE state prediction model. A preventative operation is then performed on a memory page of the system based on the predicted UE event, whereby the predicted UE event is prevented from occurring.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
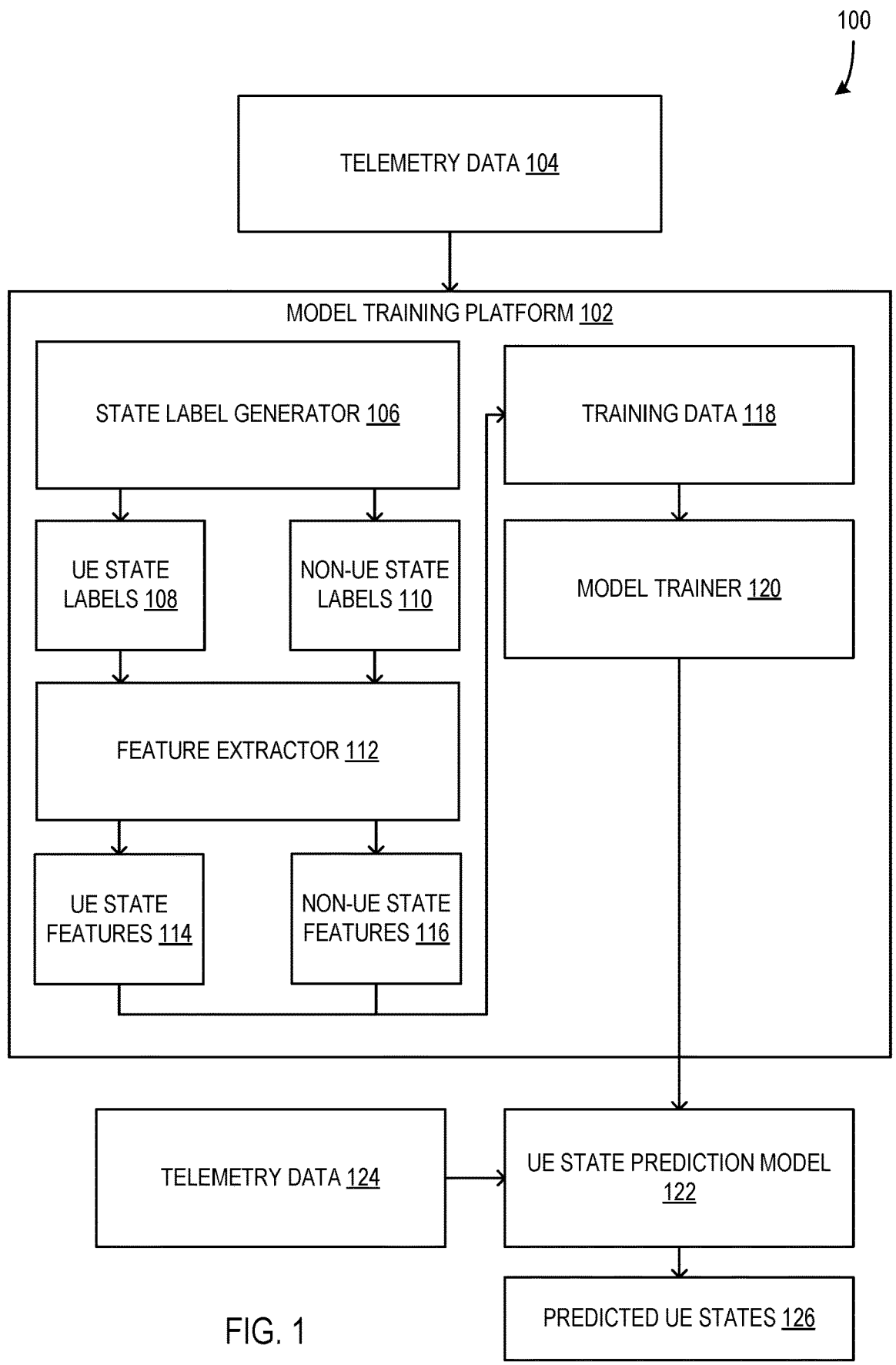
FIG. 1 is a block diagram illustrating a system configured to train a prediction model using telemetry data and to predict error states using the trained prediction model.

Aspects of the disclosure provide a computerized method and system for training a machine learning (ML) model to predict the occurrence of uncorrectable errors (UEs) on a system with sufficient lead time to take corrective action. Telemetry data associated with errors of the system is obtained or received, and sets of state labels are generated. The states identified in the telemetry data are either UE states (e.g., states of telemetry data that are indicative of a UE) or non-UE states (e.g., states of telemetry data that are not indicative of a UE). The occurrences, timing, and context (such as operational data like temperature, spatial location, or the like) of UEs and correctable errors (CEs) are a significant part of the telemetry data used in generating the labels. Statistical features of the telemetry data are extracted and associated with the generated state labels to form training data. The training data is used to train a UE state prediction model that receives telemetry data as input and provides predicted UE states as output, including memory locations and/or time data associated with the predicted UE states.

With the trained model predicting the occurrence of UEs, corrective (e.g., preventative) action can be taken as a result of the predictions. For each set of telemetry data, the trained model is used to analyze the set of telemetry data and to provide predicted UE states. The predicted UE states are provided to the system (e.g., a resource manager of the system) to take preventative action based on the predicted UE states. In some examples, the preventative action includes automatically off-lining, by the system, portions of memory (e.g., memory pages or the like) in which the UE states are predicted to occur.

In this manner, aspects of the disclosure predict, using machine learning, memory hardware failures with enough time to take preventative actions. The system uses historical records of corrected memory errors at the physical address level, and this is in turn mapped to specific memory pages and rows to predict which parts of the memory are at the highest risk for causing a failure. Using this information, the system can take appropriate, non-invasive preventative actions from within the memory via the operating system (OS).

The disclosure operates in an unconventional manner at least by predicting future faulty memory components (e.g., pages, rows, etc.) by leveraging historical CE and UE data, with enough time to take corrective action. The faulty memory components may reside in, for example, dual inline memory modules (DIMM). Using cloud scale, historical data adds accuracy and nuance relative to existing systems. This approach enables a proactive mechanism to off-line faulty memory to prevent a future reboot or other detrimental result of a memory failure. Further, the disclosure operates to control the "time to predicted error" and "total memory off-lined" for a system as requirements to offer preventative actions that are suitable for large-scale cloud infrastructures. The described systems and methods enhance actionability with respect to UEs, and address issues with extreme memory capacity reduction and memory leaks that are common in some systems today.

Further, the page and/or row off-lining mechanism described herein as a preventative action is a subtle action that does not cause disruption or degrade the user experience, in contrast with node-level or DIMM-level preventative actions that might be taken (e.g., a DIMM replacement that requires a node reboot and physical removal and replacement of parts in the associated server device).

Additionally, the system monitors memory available and adjusts page/row off-lining recommendations based on the amount of memory that has been removed previously in nearby locations.

The disclosure improves the operation of computer systems, for which it prevents UEs, at least by preventing significant downtime of memory components due to otherwise unpreventable memory errors. By predicting likely UEs, the system is enabled to perform proactive measures such as off-lining memory that is predicted to fail, and migrating or otherwise switching to the use of other system memory.

Additionally, the disclosure optimizes the process of large quantities of telemetry data and extracting features therefrom at least by storing the telemetry data in delta tables (key-value structures). The data is processed through a distributed data processing system (e.g., SPARK MapReduce) with a large data set of highly sequential events, as compared to tabular data tables.

Further, the disclosure describes a model training process that is improved through extracting features from large quantities of telemetry data, and then performing a feature selection process on the extracted features to identify features that provide the highest information gain when training the model. At least by identifying these features, the training of the model is performed quickly and efficiently.

FIG. 1 is a block diagram illustrating a system 100 configured to train a prediction model 122 using telemetry data 104 and to predict error states 126 using the trained prediction model 122. The system 100 includes a model training platform 102 that (i) generates state labels (e.g., UE state labels 108 and non-UE state labels 110) using a state label generator 106, (ii) extracts features (e.g., UE state features 114 and non-UE state features 116) from the labeled data using a feature extractor 112, and (iii) trains a UE state prediction model 122 using a model trainer 120 and training data 118 including the extracted features.

In some examples, the system 100 is located on and/or executed by a single computing device. Alternatively, or additionally, the system 100 and/or the components thereof are located on and/or executed by a plurality of different computing devices that are in communication with each other via network connections. In an example, the system 100 is stored and/or executed on a plurality of distributed cloud computing devices connected via the Internet and/or other types of communication networks. Alternatively, or additionally, in some examples, the system 100 and/or some subset thereof is located on one or more computing devices associated with an intranet-type network, such that the UE state prediction model 122 is trained to specifically predict UE states associated with devices within and/or associated with the intranet network. Further, in other examples, the system 100 is located on and/or operates on one or more computing devices in different organizations without departing from the description.

The model training platform 102 obtains, receives, or otherwise gets telemetry data 104. In some examples, the model training platform 102 includes an interface that enables other entities to provide telemetry data 104. Alternatively, or additionally, the model training platform 102 requests or otherwise obtains telemetry data 104 from other entities.

In some examples, the telemetry data 104 includes granular information on each CE (e.g., most single-device errors) and each UE (e.g., multi-device errors and certain significant single-device errors) that occurs in a physical memory infrastructure. Such an infrastructure is hierarchical (e.g., multi-layer) and complex. In such examples, a physical memory infrastructure includes memory divided into a variety of different classifications, such as memory pages, rows, columns, DIMMs or other types of physical memory modules, etc. In some cases, the adjacency of physical memory units cannot be determined by the OS of the associated computing device or system. A memory page (e.g., 4 kilobytes (KB) of memory), which is considered a basic accessible unit of memory for the OS, is abstracted by the memory controller and it can physically span across multiple rows and/or columns of the physical memory (e.g., a many-to-many relationship between memory pages and physical memory rows).

The telemetry data associated with the detected CEs and UEs of the memory include data identifying the occurrence of the errors as well as exact locations of the errors within the system, such as an exact memory page of an error, a memory row of the error, a DIMM address of the error, and a node upon which the error occurred. In some examples, the telemetry data 104 includes data that is only recorded when an error occurred, which may provide only a limited view of the memory structure and organization.

In some examples, the telemetry data is logged or otherwise collected from a large group of cloud computing devices (e.g., via WINDOWS Error Hardware Architecture (WHEA) or the like). The hourly aggregated error records of such a system includes millions of records per day and, due to the quantity of error data, it is stored in distributed delta tables. Based on an example real-world analysis of such a system, 13.5% of general nodes in the system reported at least one memory error (a CE or a UE), while only 0.2% of the nodes reported at least one UE. This indicates that UEs are relatively rare events.

As described herein, the telemetry data 104 includes data indicative of the occurrence of both CEs and UEs, the timing of the occurrence of such errors, and the portions of the memory (e.g., pages, rows, columns, nodes, or the like) that are affected by the errors. However, in other examples, the telemetry data 104 includes more, fewer, or different types of data without departing from the description. In some examples, the telemetry data 104 includes "RetryRead" information that provides additional detail about CEs and UEs, telemetry data that is used to classify UEs as either "consumed UEs" or "unconsumed UEs" (e.g., consumed UEs are more likely to result in VM reboots than unconsumed UEs and such classification enables a trained model to more precisely predict the consumed UEs), contextual telemetry data such as workloads that were running at the time of the CE/UE, and/or operational metrics such as temperature, fan speeds, or the like. In such examples, such features can be incorporated to train models and predict UEs as described herein.

The state label generator 106 generates state labels associated with UE states (UE state labels 108) and non-UE states (non-UE state labels 110). UE states and non-UE states are defined as binary class labels that are used by the model to predict the occurrence of UEs. In particular, UE state labels 108 are generated in reference to the occurrence of a UE and a quantity of telemetry data that leads up to the occurrence of the UE. Alternatively, non-UE state labels 110 are generated in reference portions of telemetry data that are not associated with the occurrence of a UE. For example, a non-UE state label 110 is generated in reference to the occurrence of a CE and a quantity of telemetry data that leads up to the occurrence of the CE, wherein no UE occurs in that data.

In some examples, the labels 108 and 110 are generated in reference to UE events and CE events, respectively, and to 28 days of telemetry data 104 that leads up to the occurrence of those events. In other examples, other time intervals or ranges of telemetry data other than 28 days are used without departing from the description. Further, in some examples, to train the UE state prediction model 122 to provide at least one hour of warning for a predicted UE, the time interval of data associated with the labels 108 and 110 is adjusted to exclude the hour of time immediately prior to the occurrence of the associated event. For instance, a UE state label 108 is generated in reference to a UE event and the telemetry data associated there with is telemetry data from 28 days prior to the UE event up to one hour prior to the UE event.

Additionally, or alternatively, the telemetry data associated with the labels 108 and/or 110 includes telemetry data that is specific to portions of the physical memory that are affected by the associated event. For instance, if a UE event occurs in a particular memory page and a particular memory row, the telemetry data associated with the UE state label 108 of that UE event includes telemetry data associated with that memory page and/or that memory row, while telemetry data associated with other portions of memory that are unrelated to the UE event is not included with the UE state label 108. Further, in some examples, the telemetry data of a UE state label 108 includes telemetry data associated with portions of the physical memory that are within a defined proximity of the UE event (e.g., telemetry data associated with one or more memory rows that are adjacent to the memory row in which the UE event occurred is included with the UE state label 108).

In some examples, the quantity of possible non-UE state labels 110 far exceeds the quantity of possible UE state labels 108 due to the relative rarity of the occurrence of UE events. In such examples, the non-UE state labels 110 are generated by sampling a small fraction of the total potential non-UE states. For instance, in an example, ten non-UE state labels 110 are generated per node and those labels 110 are chosen to reference non-UE states that are temporally distant from UE events (e.g., at least seven days away from any UE occurrence). Such a sampling mechanism balances the quantities of UE state labels 108 and non-UE state labels 110. Further, the sampling mechanism enables the trained model to predict UEs with more reaction time and provides greater discriminatory power to the model.

Additionally, or alternatively, a UE state label 108 includes a reference to a UE event or occurrence, which includes time data indicating when the UE event occurred and memory location data indicating where in the physical memory and/or memory pages the UE event occurred, as previously described. The UE state label 108 further includes a reference to a time interval of telemetry data that includes other events, such as CEs. In many examples, the generated UE state labels 108 reference only "first UEs", which are UEs that occur in or around memory locations that have not experienced a UE recently or at all. For example, a UE that occurs in a memory location where a UE has not occurred for two months is used to generate a UE state label 108 and/or a UE that occurs in a memory location where UE occurred seven days ago is not used to generate a UE state label 108. In such examples, a time threshold for determining whether a UE is a first UE is defined for use by the state label generator 106. In most cases, the time threshold meets or exceeds the time interval of telemetry data that is referred to by each label 108 and/or 110, but the threshold may be greater than or otherwise differ from that time interval without departing from the description.

Further, in some examples, only a subset of all UEs can be prevented by off-lining parts of the memory infrastructure. A UE is actionable if prior memory CEs are present in the same memory location or abstraction level. In one example, it was found that an average of 45% of UEs are actionable at the Page and Row level of the memory. DIMM-level actions can predict more UEs but require a node-level action such as taking a node "Out-For-Repair" (OFR), which negatively affects or otherwise degrades user experiences.

In such examples, the model 122 is trained on a first UE occurrence on a node with at least one month of prior time that is free of UEs. This helps to avoid any right-censoring bias due to node-level rules that are applied after UE occurrences on the node (e.g., a rule that causes a node to be taken OFR after a UE occurrence). Secondly, it is difficult to predict the first UE because once a DIMM starts failing, it is expected to continue failing in most cases. Although the training of the model 122 is focused on "first UEs", it can be inferenced on subsequent UEs as well. The eligible, actionable UEs that have at least one prior CE on the same page or row in the last 28 days (or other defined time interval) are considered for modeling as described herein. The system states are formulated as a binary classification problem to predict the likelihood of a UE state or occurrence given the characteristics of prior CEs in the same page or row.

The feature extractor 112 extracts features, including UE state features 114 and non-UE state features 116, from the labeled data of the labels 108 and 110. The extracted features are used by the model trainer 120 as training data 118. To the extent that the features 114 associated with UE states differ from the features 116 associated with non-UE states in a consistent manner, the model trainer 120 trains the UE state prediction model 122 to predict future or upcoming UE states based on those differences.

In some examples, the extracted features include temporal statistics and/or characteristics of CEs that are present in the labeled data of the UE state labels 108 and the non-UE state labels 110. These characteristics are featurized by the feature extractor 112 based on historical data over 28-day, 7-day, 1-day, and/or other ranges. Further, the featurization is performed by tracking CEs at the same page level, row level, and/or node level. Analyzing the labeled data using different time intervals and/or different memory levels results in the generation of a wide variety of different features that are indicative of UE states or non-UE states. In some examples, extracted features include simple statistics (e.g., total CE counts, Minutes from Latest CE, and Oldest CE); hourly (or other time period) series statistics (e.g., average CEs, standard deviations, maximums and/or minimums, latest values, percentage-based statistics such as $50^{th}$ percentile or $75^{th}$ percentile); and/or "Error-Blocks of Consecutive Hours with Errors" (e.g., a total number of blocks, distribution of blocks, length, density, and/or distance (in time) from reference, maximum, average, and/or standard deviations associated with blocks).

However, some of the extracted features are not strongly indicative of a UE state or a non-UE state, and/or are correlated with each other. In such examples, a feature selection process is performed to remove a subset of statistical features that can be correlated with each other (e.g., features that are collinear). In some examples, third-party tools are utilized for this process to select a subset of features that are largely uncorrelated and help towards learning the characteristics of UE-states and Non-UE states for use in training the model as described herein. Further, in some examples, such as examples using the XGBoost classification algorithm as described below, extracted features that are found to have the most importance or average gain include 'Number of Unique Hours with CEs', '$75^{th}$ Percentile of CE counts', 'Median of CE block distances', and 'Hourly Variability of CE counts'.

The training data 118 made up of a portion of the extracted features 114 and 116 and/or labeled telemetry data of the UE state labels 108 and non-UE state labels 110 is used by the model trainer 120 to train the UE state prediction model 122 using machine learning techniques. In some examples, the model trainer 120 trains the model 122 to receive sets of telemetry data as input and to classify the input telemetry data as either a UE state or a non-UE state. Further, in some examples, the model trainer 120 trains the model 122 to specifically analyze input telemetry data using the extracted and/or selected features 114 and/or 116 (e.g., if a CE average value is one of the selected features, the model 122 is trained to calculate the CE average value of input telemetry data when classifying the input). Generally, the model trainer 120 trains the model 122 using training data, evaluates the performance of model 122, and uses that performance evaluation as feedback to adjust and improve the accuracy of the model 122 according to machine learning techniques. The training of the model 122 is described in greater detail at least with respect to FIG. 2.

After the UE state prediction model 122 is trained by the model training platform 102, the UE state prediction model 122 receives telemetry data 124 and provides predicted UE states 126 as output. In some examples, the telemetry data 124 is in substantially the same format as the telemetry data 104 used to train the model 122. Further, the predicted UE states 126 include references to portions of the telemetry data 124, timing data indicating a time interval in which the UE is predicted to occur, and/or memory location data indicating the portions of the memory that will be affected by the predicted UE (e.g., a memory page, a memory row, a node, or the like). The process of using the model 122 to predict UE states 126 is described in greater detail at least with respect to FIG. 3.

In some examples, memory hardware from which the telemetry data 104 is collected contains a hierarchical structure with different levels of abstraction, such as memory pages, rows, columns, banks, ranks, chips, DIMMs, channels, sockets, or the like. Within a specific memory abstraction level or memory hierarchy level, a subset of all UEs are 'actionable'. Historical error data (e.g., at least one CE) at the same memory location is required for a UE to be an eligible candidate for preventative action. The proportion of actionable UEs depends on the memory error dynamics and the completeness of the telemetry data. However, in some cases, only a subset of actionable UEs are 'predictable' by the described models based on the model accuracy and time-to-action restrictions. Due to limitations of the described systems and processes, only a subset of predicted UEs result in off-lining of memory, such that the set of prevented UEs is a subset of predicable UEs.

In some real-world examples, approximately 45% of UEs are estimated to be actionable at the page and row levels of memory, and approximately 84% and approximately 95% of UEs are estimated to be actionable at the DIMM-level and node-level, respectively. As a result of these differences, in some examples, models such as the UE state prediction model 122 described herein are built at different memory hierarchy levels or abstraction levels such that they complement each other to address the entire set of actionable UEs.

Each model is configured to target UEs at the associated memory hierarchy level. However, the cost of off-lining memory at the page level or the row level is comparatively much less compared to off-lining at the DIMM level or node level, such that the cost of false positives at the DIMM and node levels is much greater. Thus, models at the page and row levels may be tuned or biased for high recall with less consideration toward avoiding false positives, while models at the DIMM and node levels may be tuned or biased toward accuracy and more toward avoiding false positives. These models at different hierarchy levels complement each other by cascading the predictions and taking appropriate preventative actions. Such interaction between models at different levels of abstraction enables efficient and effective control of large proportions of system memory with respect to UE prevention.

Figure 2:
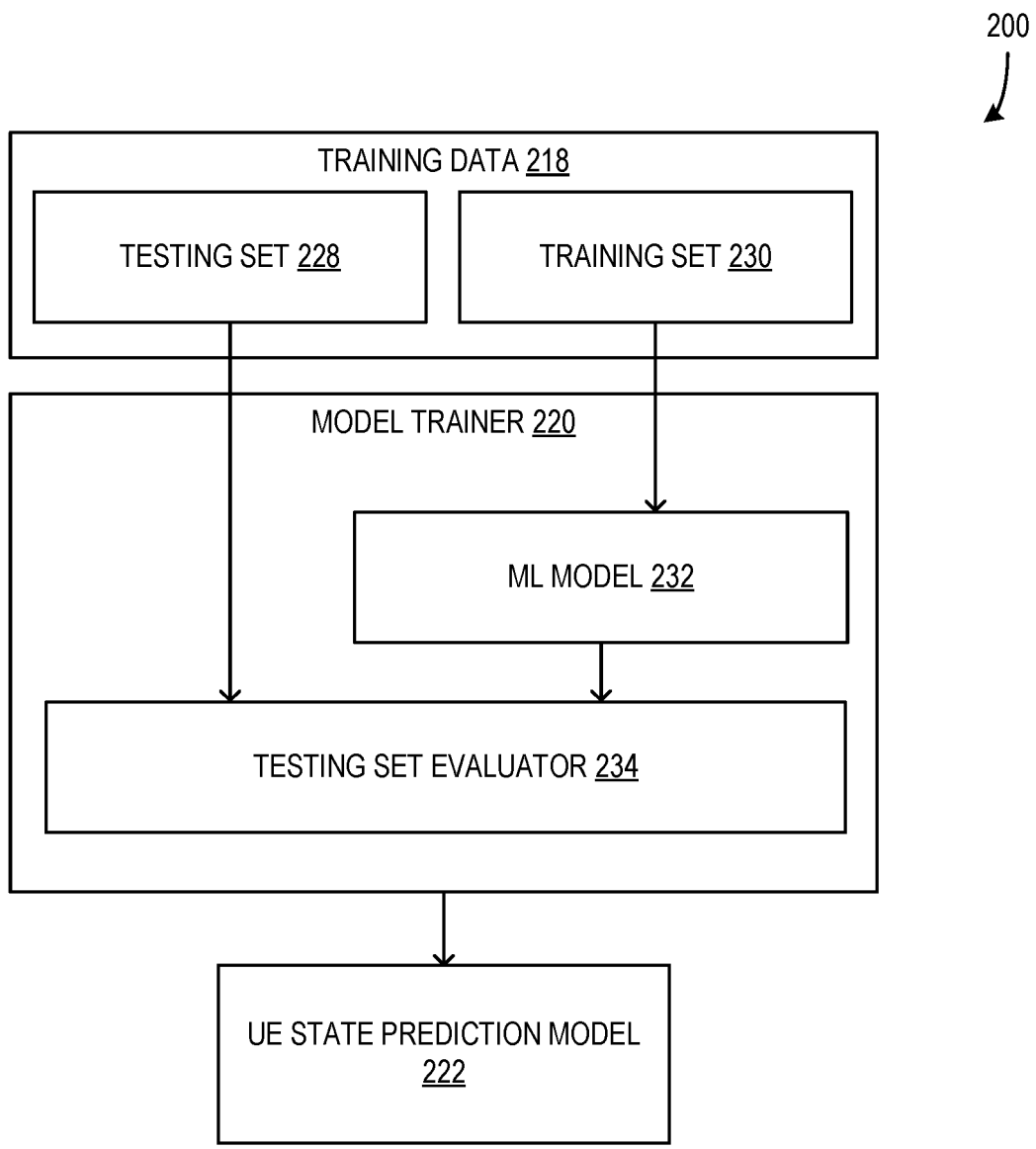
FIG. 2 is a block diagram illustrating a system configured to train a prediction model using a training data set and a testing data set.

FIG. 2 is a block diagram illustrating a system 200 configured to train a prediction model 222 using a training data set 230 and a testing data set 228. In some examples, the system 200 is part of or otherwise associated with a system such as system 100 of FIG. 1.

The training data 218 is divided into the testing set 228 and the training set 230. The training set 230 is used by the model trainer 220 to train a ML model 232 and the testing set 228 is used by a testing set evaluator 234 of the model trainer 220 to test the ML model 232. In some examples, the model trainer 220 performs training operations in a loop when training the UE state prediction model 222. In such examples, after the ML model 232 is evaluated by the testing set evaluator 234, the output of the evaluation is used by the model trainer 220 to further improve the ML model 232 during a next iteration of the training process. In some examples, this process loop is performed repeatedly until the ML model 232 performs with sufficient accuracy. For instance, in an example, the training process loop is performed until the ML model 232 accurately classifies UE states for more than 75% of the instances in the testing set 228. In other examples, different accuracy thresholds are used without departing from the description. Alternatively, or additionally, the training process loop is performed up to a number of times equal to a defined iteration maximum (e.g., if the model reference object 232 is iteratively trained 10 times, the training process loop ends). Once the training process is complete, the UE state prediction model 222 is generated based on the ML model 232 by the model trainer 220 as described herein. In some examples, the ML model 232 is trained based on hyper-parameter tuning and cross-validation processes.

In some examples, the model trainer 220 applies a classifier training algorithm (e.g., XGBoost) using the training data 218. The training set 230 of the training data 218 is configured to have balanced quantities of UE states and non-UE states, which is done through random under-sampling and/or Synthetic Minority Oversampling Technique (SMOTE). In other examples, other algorithms are used, such as Logistic Regression algorithms, but in testing, the XGBoost classifier algorithm was found to be more effective than Logistic Regression.

Further, in some examples based on the Precision-Recall curves, the model threshold is tuned to achieve an 80% recall and a 25% precision on a set of data (e.g., the model is tuned to err on the side of predicting a UE state when one is possible rather than maximizing the accuracy of the UE state predictions). The model is tuned for high recall because the cost of taking preventative action (e.g., page off-lining) is much less than a UE resulting in the rebooting of a virtual machine (VM) and/or other error recovery processes. For instance, in some examples, off-lining 1,000 pages reduces about 4 megabytes (MB) of a node's memory, resulting negligible effects to users, while a single VM reboot can drastically affect users for relatively long time periods during downtimes.

In some examples, the testing set evaluator 234 determines a subset of features that are most important and/or have the highest average gain during the training process. For instance, in an example, the testing set evaluator 234 uses SHapely Additive exPlanation (SHAP) interpretability to identify the features that have significant effects on the output of the model. Such processes enable the disclosure to be used to better explain and interpret the model, taking a step toward responsible AI.

Figure 3:
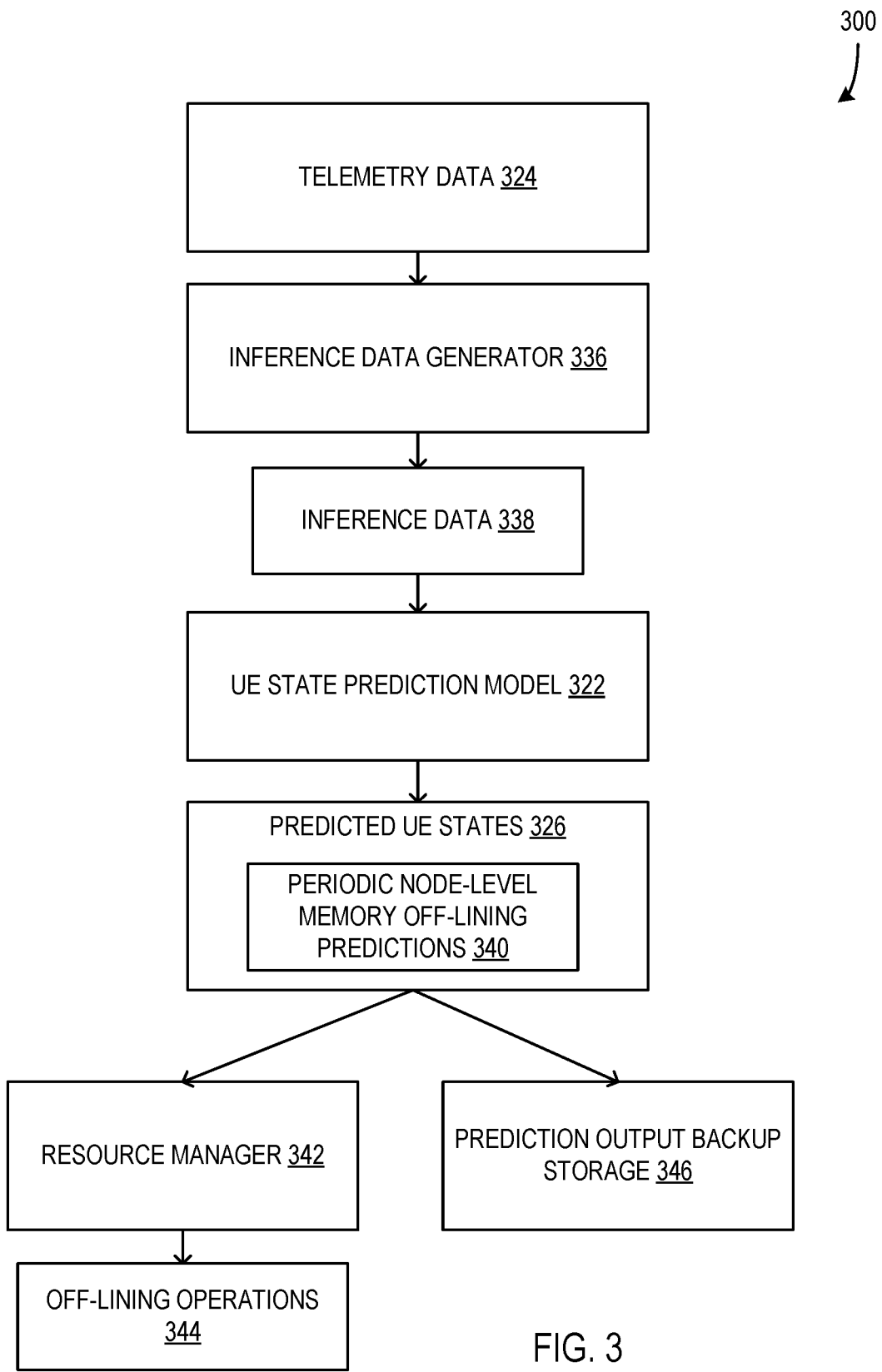
FIG. 3 is a block diagram illustrating a system configured to predict UE events and to take preventative action based on the predictions.

FIG. 3 is a block diagram illustrating a system 300 configured to predict UE events 340 and to take preventative action based on the predictions. In some examples, the system 300 is part of or otherwise associated with a system such as system 100 of FIG. 1. The telemetry data 324 is processed by an inference data generator 336 into inference data 338. The inference data 338 is provided as input to a UE state prediction model 322 (e.g., a trained model such as model 122 and/or 222) and predicted UE states 326 are generated as output of the model 322. The predicted UE states 326 include periodic node-level memory off-lining predictions 340 that are provided to a resource manager 342 of the system 300 and a prediction output backup storage 346 for storage. The resource manager 342 performs off-lining operations 344 based on receiving the predictions 340.

In some examples, the inference data generator 336 performs node-level grouped data transformation on the telemetry data 324. Such data transformations are configured to convert telemetry data 324 into feature data (e.g., statistical features such as UE state features 114 and/or non-UE state features 116). The resulting features are node-level, such that feature values are based on telemetry data 324 from within nodes. For example, average data values are based on data associated with a single node and such data values are generated for each node of the system that is being analyzed.

Additionally, or alternatively, the feature extraction performed on the telemetry data 324 by the inference data generator 336 includes extracting dynamic features (e.g., features that change over time, such as CE count averages that are updated as additional telemetry data is received) and static features (e.g., features that do not change and/or are associated with single instances of telemetry data, such as a CE count for a node over a defined time interval) associated with all memory pages from all nodes of the system.

In some examples, the resource manager 342 receives the off-lining prediction 340 and queues them for processing. Further, the resource manager 342 performs the off-lining operations 344 or otherwise causes the off-lining operations 344 to be performed. The off-lining operations 344 include operations performed on memory pages. For instance, in examples where an off-lining operation 344 is configured to take a memory page off-line, the resource manager 342 identifies physical memory locations in the system that are associated with the target memory page and off-lines those associate physical memory locations. The off-lining may be performed by an OS, by a hypervisor, or other component. Such an operation affects one or more memory rows of the system that may or may not be adjacent to each other.

In another example, the resource manager 342 receives an off-lining prediction 340 relating to a row. The system may off-line just that row, the page that contains the row (e.g., if the row is entirely contained within the page), or multiple pages (e.g., if multiple pages contain parts of that row or are otherwise impacted by the row).

In still other examples, the system may off-line an entire node.

Figure 4:
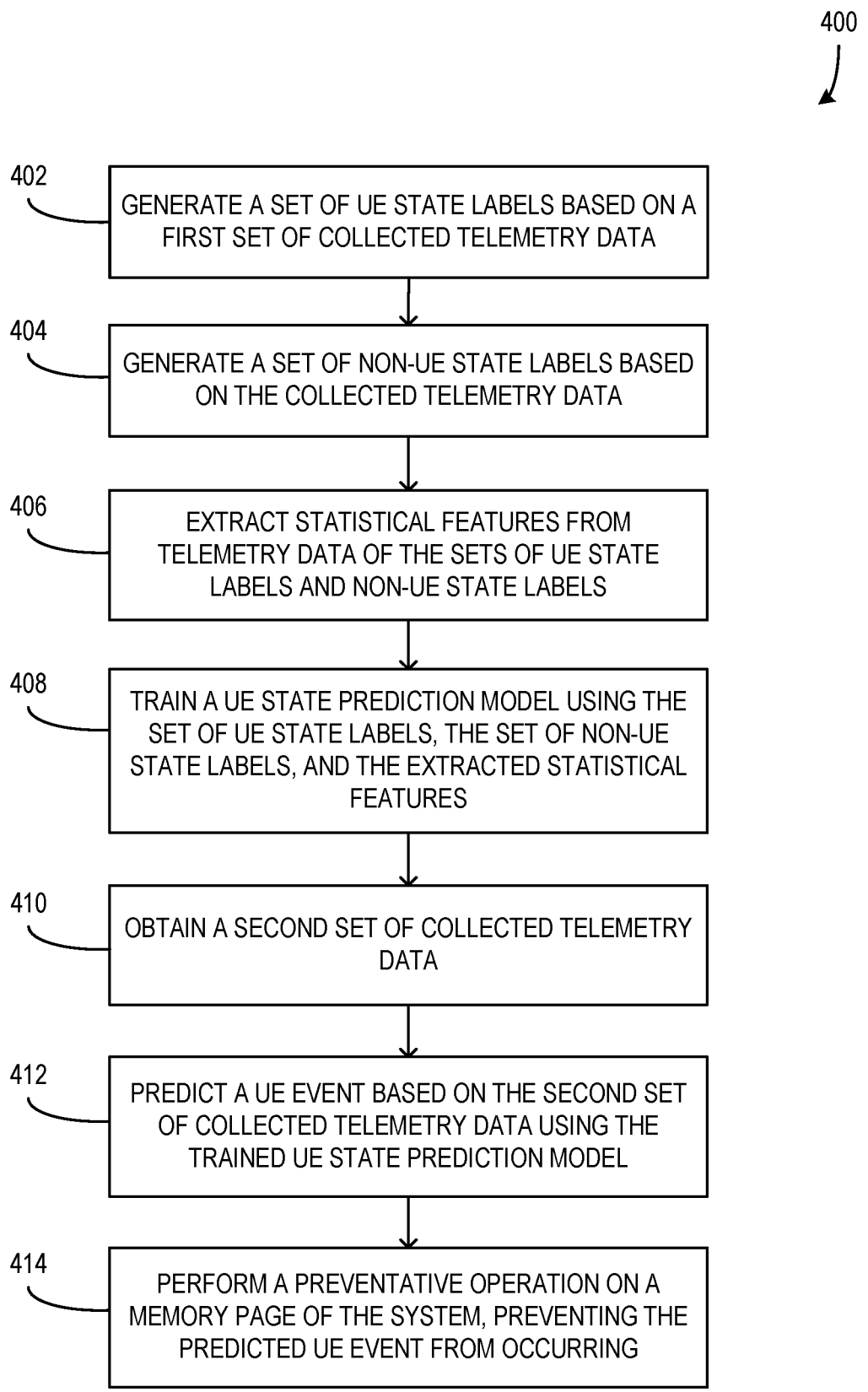
FIG. 4 is a flowchart illustrating a computerized method for training a prediction model using telemetry data and to predict error states using the trained prediction model.

FIG. 4 is a flowchart illustrating a computerized method 400 for training a prediction model (e.g., the UE state prediction model 122) using telemetry data (e.g., telemetry data 104) and to predict error states (e.g., predicted UE states 126) using the trained prediction model. In some examples, the method 400 is executed or otherwise performed on a system such as system 100 of FIG. 1. At 402, a set of UE state labels is generated based on a first set of collected telemetry data and, at 404, a set of non-UE state labels is generated based on the first set of collected telemetry data.

In some examples, generating the labels includes identifying individual UE events and CE events and linking those events to a telemetry data in a time interval leading up to the events, as described herein. For instance, in an example, generating a UE state label includes identifying a "first UE" in telemetry data, where the first UE is the first UE to occur in a portion of memory for a defined period, and linking the UE to the telemetry data of that portion of memory over the 28 days prior to the UE. Thus, the generated UE state label references the UE and the set of prior telemetry data from the 28-day interval.

Additionally, in some examples, the telemetry data referenced by a generated UE state label is determined based on a defined error prevention interval length (e.g., a minimum period of time for performance of error prevention operations when a likely UE is detected). For instance, in some examples, the error prevention interval length is defined as one hour and the set of telemetry data referenced by a generated UE state label excludes telemetry data from a one-hour period immediately prior to the occurrence of the labeled UE event. By excluding such data, the generated UE state labels can be used to train a model to predict UEs as described herein such that the predictions will give the system sufficient time to take preventative action.

Further, the set of non-UE state labels are generated in a substantially similar way as the set of UE state labels. One difference is that a non-UE state label is generated to reference a CE and telemetry data from a similar time interval prior to the reference CE. Further, the telemetry data referenced by a non-UE state label does not include a UE. Additionally, or alternatively, the CE used to generate a non-UE state label is selected based on being temporally distant from any UE in the associated portion of memory. For example, a CE is chosen only if it is at least a defined interval of time before a UE and/or after a UE.

In some examples, the telemetry data includes many times more potential non-UE states than UE states. In such examples, generating the set of non-UE state labels includes sampling from possible non-UE states as described herein (e.g., sampling random CEs, sampling CEs that are temporally evenly spaced throughout the telemetry data, sampling CEs that are evenly spaced across hierarchical levels of the system (pages, rows, nodes, etc.), or the like).

At 406, statistical features are extracted from the telemetry data of the sets of UE state labels and non-UE state labels. In some examples, the extracted statistical features are based on the presence of CEs in the referenced sets of telemetry data that are associated with the UE state labels and the non-UE state labels. Such features include CE count values, average CE count values, CE rate values over time intervals, or the like. Other possible features include standard deviations, maximums and/or minimums, latest values, percentage-based statistics such as $50^{th}$ percentile or $75^{th}$ percentile.

Additionally, or alternatively, in some examples, the extracted statistical features include features based on a plurality of different time intervals (e.g., statistics based on one-day time intervals, statistics based on 7-day time intervals, statistics based on 28-day time intervals, or the like). Further, the extracted statistical features include features based on a plurality of different memory hierarchy levels, wherein the plurality of memory hierarchy levels include memory page levels, memory row levels, node levels, or the like. In such examples, the extracted features are used to train a UE state prediction model to predict UE events associated with the plurality of different memory hierarchy levels and preventative operations performed based on predicted UE states are performed based on memory hierarchy levels with which the predicted UE states are associated.

At 408, a UE state prediction model is trained using the set of UE state labels, the set of non-UE state labels, and the extracted statistical features. In some examples, the UE state prediction model is trained to receive telemetry data as input, extract statistical features from the received telemetry data, and classify states in the telemetry data as UE states and/or non-UE states based on the associated statistical features, as described herein. Additionally, or alternatively, the UE state prediction model is trained with a bias toward high recall when predicting UE events. For example, the model is trained to be biased toward predicting any possible UE events even if some of those events are predicted inaccurately (e.g., ultimately do not occur).

At 410, a second set of collected telemetry data is obtained and, at 412, a UE event is predicted based on the second set of collected telemetry data using the trained UE state prediction model. In some examples, telemetry data is collected at a defined interval by a system and provided to the UE state prediction model for analysis. For each set of telemetry data provided to the UE state prediction model, the model is configured to provide output that includes predicted UE events, locations within the memory infrastructure where the UE events are likely to happen, and/or time information indicating when it is likely the UE events will happen. Additionally, or alternatively, the UE state prediction model provides other output data, such as predicted CE events and/or predicted non-UE states of portions of the memory.

At 414, a preventative operation is performed on the memory page of the system, preventing the predicted UE event from occurring. In some examples, the preventative operation includes off-lining the memory page with which the predicted UE event is associated. Additionally, or alternatively, in examples where a predicted UE is associated with a different memory hierarchy level, the preventative operations include operations that prevent the occurrence of the UE at that different memory hierarchy level (e.g., off-lining a memory row, including memory pages that use the memory row, that is predicted to fail as a UE).

Further, in some examples, limits are defined for a quantity of memory that can be off-lined through preventative operations. For instance, the quantity of memory that can be off-lined for a node is set to a 4 MB limit.

Figure 5:
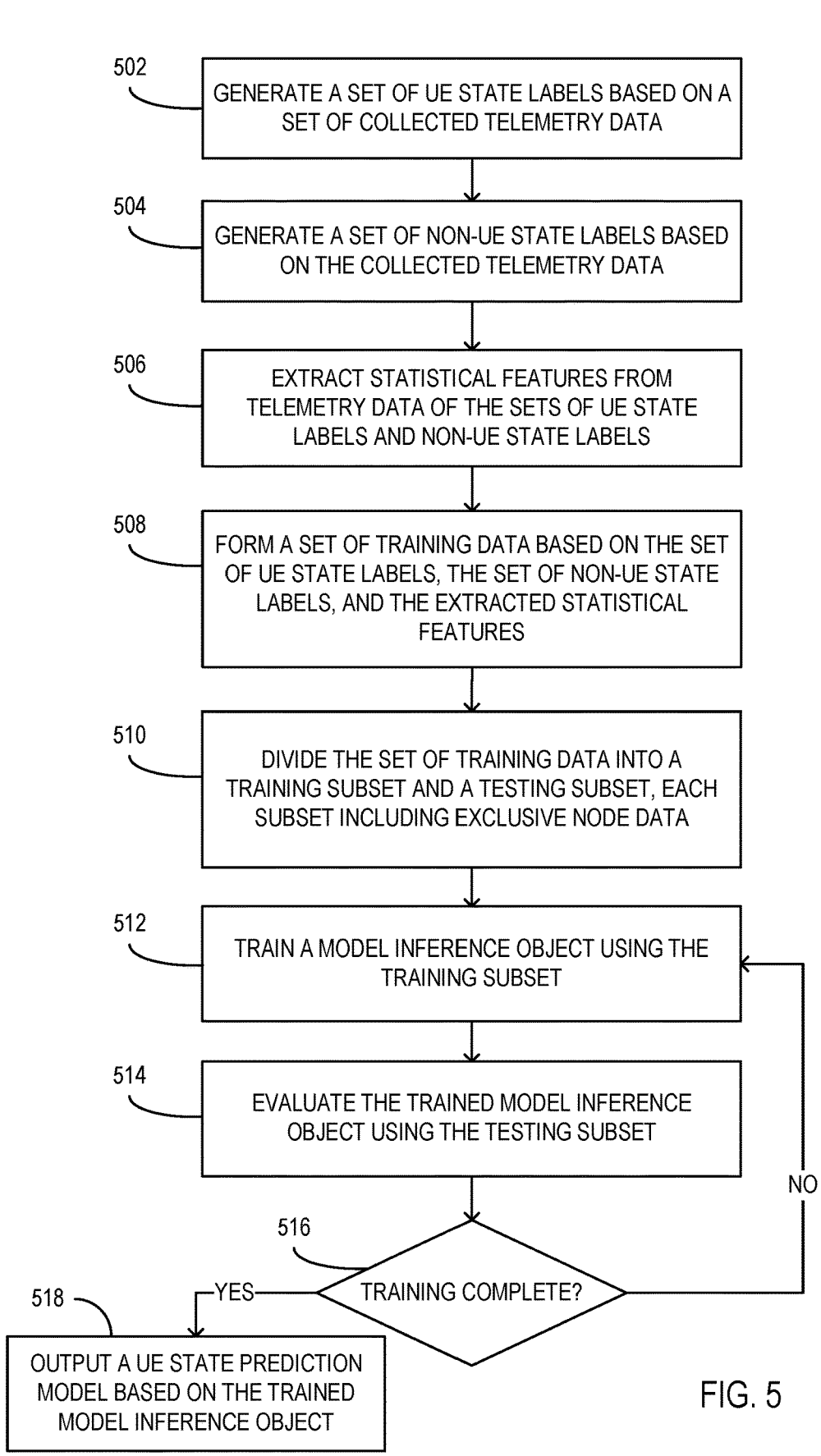
FIG. 5 is a flowchart illustrating a computerized method for training a prediction model iteratively using a training data set and a testing data set.

FIG. 5 is a flowchart illustrating a computerized method 500 for training a prediction model (e.g., the UE state prediction model 122) iteratively using a training data set (e.g., training set 230) and a testing data set (e.g., testing set 228). In some examples, the method 500 is executed or otherwise performed on a system such as systems 100 and 200 of FIGS. 1 and 2 respectively. At 502, a set of UE state labels is generated based on a set of collected telemetry data and, at 504, a set of non-UE state labels is generated based on the set of collected telemetry data. Then, at 506, statistical features are extracted from the telemetry data of the sets of UE state labels and non-UE state labels. In some examples, 502-506 are performed in substantially the same way as 402-406 of FIG. 4, described above.

At 508, a set of training data is formed based on the set of UE state labels, the set of non-UE state labels, and the extracted statistical features. At 510, the set of training data is divided into a training subset and a testing subset. Each of the training subset and the testing subset include exclusive node telemetry data, such that telemetry data in the training subset is associated with a first set of nodes and telemetry data in the testing subset is associated with a second set of nodes and there are no nodes that are in the first set of nodes and the second set of nodes.

At 512, a ML model is trained using the training subset. In some examples, the ML model is trained using machine learning techniques. For instance, in some examples, the ML model is trained to analyze telemetry data and associated statistical features of UE state labels in the training subset and to classify that telemetry data as a UE state based on that analysis. Such analysis includes applying a set of weights to various statistical features to form weighted values and combining the weighted values to form a total score that is indicative of either a predicted UE state or a predicted non-UE state. In such examples, the training process includes adjusting the set of weights to improve the accuracy of predictions made by the ML model.

At 514, the trained ML model is evaluated using the testing subset. In some examples, the telemetry data and associated statistical features of the testing subset are provided to the trained ML model and classifications of the data of the testing subset are evaluated for accuracy, efficiency, and/or other factors. Such an evaluation includes determining a quantity of correct classifications and a quantity of total possible classifications. These values are used to compute an accuracy percentage and/or other performance measures of the ML model.

If, at 516, the training is complete, the process proceeds to 518. Alternatively, if the training is not complete, the process returns to 512. In some examples, the training is complete if an accuracy percentage or other performance measures of the ML model meet defined performance threshold values (e.g., if the accuracy percentage of the ML model exceeds a performance threshold of 80%). Additionally, or alternatively, the training is complete when the ML model has been trained over a defined quantity of iterations (e.g., the ML model is trained over 20 iterations over 512-516). In other examples, other methods are used to determine whether the training of the ML model is complete.

At 518, a UE state prediction model is output based on the trained ML model. The UE state prediction model can then be used to predict likely or future UE states in a system, as described herein.

Figure 6:
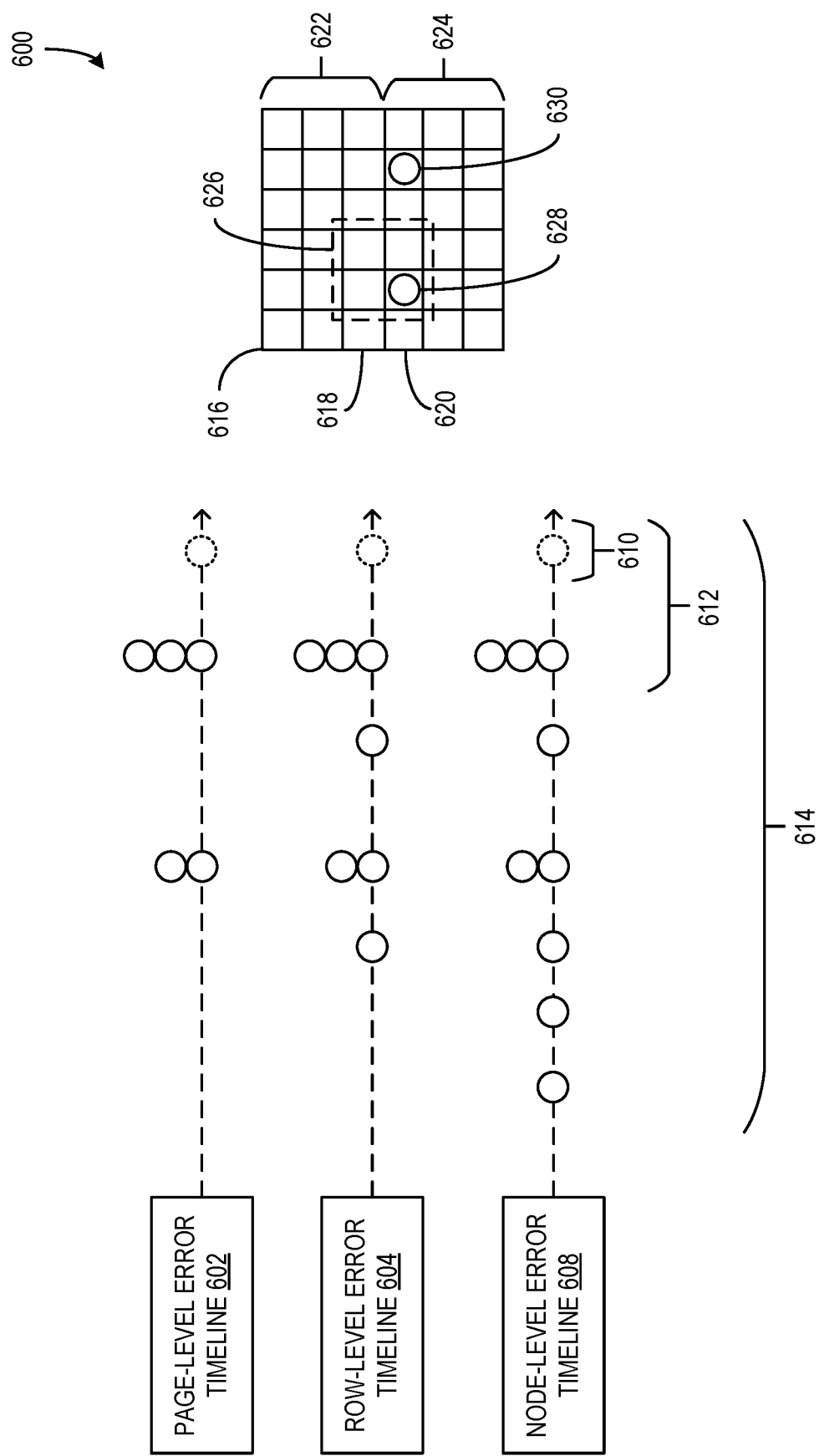
FIG. 6 is a diagram illustrating error timelines at different hierarchical memory levels and a memory portion representing those levels.

FIG. 6 is a diagram 600 illustrating error timelines 602, 604, and 606 at different hierarchical memory levels and a memory portion 616 representing those levels. In some examples, the errors illustrated in the error timelines 602, 604, and 606 are included in telemetry data (e.g., telemetry data 104 and/or 124) used in a system such as system 100 of FIG. 1 as described herein.

The illustrated timelines include a page-level error timeline 602, a row-level error timeline 604, and a node-level error timeline 608. The page-level error timeline 602 shows the occurrence of CEs within the memory locations associated with an individual memory page (e.g., memory page 626). In some examples, a memory page spans multiple memory rows and/or columns, multiple memory banks, and/or other combinations of physical memory locations. A memory page in such examples is a unit of memory used by the OS of the system and it is abstracted from the physical memory structure. To interact with physical memory locations using memory pages, the OS is configured to make use of a memory management interface at a software, firmware, and/or hardware level. The CEs that have occurred over the period of the timeline are illustrated as circles place on or above the line. CEs that occur within the same hour of time are illustrated as being stacked on top of one another.

The row-level error timeline 604 shows the occurrence of CEs within the memory locations associated with an individual memory row (e.g., row 618 or 620). In some examples, a memory row is a group of memory locations that are physically adjacent within a larger physical memory structure, such as a memory bank, a memory chip, and/or a DIMM. As described above, in some examples, memory pages include memory locations from multiple memory rows.

The node-level error timeline 606 shows occurrence of CEs within the memory locations associated with an entire node (e.g., a node that includes the memory portion 616). In some examples, such a node includes a plurality of memory rows and/or memory pages. Additionally, or alternatively, the node includes various other types of sections of memory without departing from the description (e.g., memory banks such as banks 622 and/or 624).

The timelines span intervals 610, 612, and 614. Interval 610 represents an interval associated with a defined error prevention time (e.g., one hour to provide a one-hour lead time for preventing or otherwise correcting errors). In some examples, CEs that occur during the interval 610 (illustrated with a dotted line) are excluded from labeled telemetry data used to train a UE state prediction model (e.g., model 122).

Interval 612 (e.g., a one-day interval, a seven-day interval, or the like) is a longer interval than interval 610. In some examples, an interval 612 is used as one of the intervals upon which a UE state prediction model is trained (e.g., features associated with CEs occurring over the interval 612 are extracted from the telemetry data). Similarly, interval 614 (e.g., a 28-day interval) is still longer than interval 612 and is used as the longest interval of telemetry data used for training a UE state prediction model as described herein. In other examples, more, fewer, or different intervals of time are used with associated telemetry data to train a model as described without departing from the description.

As illustrated, some of the CEs overlap across multiple timelines and others do not. The three stacked CEs in the interval 612 are shown on all three timelines, while the prior CE just outside the interval 612 appears on only the row-level error timeline 604 and the node-level error timeline 608. This difference indicates that the three stacked CEs occurred in a memory location or locations (e.g., memory location 628) that are in the memory page, the memory row, and the node, while the prior CE occurred on the node and in the row, but outside of the page that is being illustrated. For instance, in an example, that CE occurred at memory location 630, which is in row 620 of the memory portion 616, but outside the memory page 626. Because the memory page and memory row are located within the node, the CEs illustrated on each of the page-level error timeline 602 and the row-level error timeline 604 are always reflected on the node-level error timeline 608. However, the node-level error timeline 608 can also show CEs that occur outside of the page and the row. Similarly, the page-level error timeline 602 can include CEs from outside the row (e.g., a CE that occurs in page 626 and row 618 does not appear on a row-level error timeline 604 associated with row 620 but it does appear in the page-level error timeline 602 associated with page 626) and the row-level error timeline 604 can include CEs from outside the page (e.g., a CE that occurs at memory location 630 as previously described).

The diagram 600 illustrates how error prevention operations such as off-lining portions of memory can be used at different hierarchical levels of the memory portion 616. For instance, in an example, a UE that is predicted at memory location 628 based on page-level features and/or using a page-level trained model is addressed by off-lining the memory locations associated with the page 626 and/or by off-lining the memory rows 618 and 620 that are spanned by the page 626. Additionally, or alternatively, if the UE is predicted at memory location 628 based on row-level features and/or using a row-level trained model, it is addressed by off-lining the row 620 and/or by identifying the page 626 as being affected by the predicted UE and off-lining the page 626. In such examples, if other memory pages that use portions of the row 620 are impacted by the predicted UE, they are also off-lined. Further, in some examples, off-lining the page 626 includes identifying and off-lining the rows 618 and 620 as well.

In some examples, a system such as system 100 includes one or more models trained to predict UEs based on page-level features, row-level features, and/or other hierarchical level-based features. Further, such multi-level feature use also includes using features based on different intervals of telemetry data (e.g., features in interval 612 and/or interval 614). As a result, a UE can be predicted based on identified row-level features over the interval 612, page-level features over the interval 612, row-level features over the interval 614, and/or page-level features over the interval 614. In other examples, other types of levels and intervals are used without departing from the description.

Using this multiplicity of hierarchical levels and intervals enhances the likelihood that such a system will predict a UE and cause error prevention operations to be performed. For instance, in an example, a UE is predicted based on row-level features over the interval 614 but it is missed during analysis of other types of features and other intervals.

Additional Examples and Metrics

In some real-world examples, models are assessed via online evaluation through simulation. Daily, 12-hourly, 6-hourly, 3-hourly, and hourly inference on 28 days' worth of telemetry data is considered. The inference frequency is tuned to optimize for a 'rate of UE predicted' and computational time. This simulation is applicable for both first UEs and subsequent UEs. At least one hour of error prevention time is used to limit the training telemetry data sets. The following metrics were computed using such a configuration with 447 nodes reporting 1,288 UEs, of which 495 UEs were actionable at the page and/or row level:

Rate of UE Predicted: The proportion of the actionable (eligible) UEs predicted: 76.36%

$10^{th}$ Percentile of Time to UE (e.g., time for the system to react): ~24 hours (more than 90% of the predicted UEs had more than 24 hours lead time)

It was observed that the proposed ML model predicted 26 times more UEs than the existing empirical heuristic (CE>=16 in 24 hours).

Further, in real-world examples, it was observed that 98% of nodes off-lined less than 4 MB of memory in a 28-day period. Even in extreme cases where 8 MB of memory was off-lined in a node with 196 gigabytes (GB) of memory, not more than 0.25% of the memory of the node would be off-lined considering a continuous execution over five years. This remains within an accepted threshold of 5% of memory off-lining. Therefore, even when limiting the memory off-lined to 4 MB per 28-day interval, the model is able to retain the rate of UEs predicted while providing stable operation of the system. The nodes where more than 4 MB worth of memory are predicted to be affected by a UE are typically in scenarios where many unique pages had CEs in the last 28-day interval, suggesting an issue at the DIMM or node level. In some examples, such nodes are recommended to a node-level system for DIMM-replacement or other node-level preventative actions.

In related examples, customer and/or user impact of UEs is estimated. To obtain such an estimate, UEs are associated with VM reboots to estimate VM reboots predicted by the described model. Heuristics are developed by accounting for telemetry timestamp variations. All hardware related VM reboots are considered and one VM reboot per container per hour is considered as a unique VM reboot in each node (90% of the time, only one VM reboot was found in an hour per container). A VM reboot is associated with a UE if the reboot occurs one hour or less before the UE timestamp. This association is a many-to-many association such that multiple VM reboots can be associated to a single UE and vice versa.

In such examples, the proposed model was found to predict 68.9% of the actionable UEs, and those UEs were associated with 84.5% of actionable VM reboots while off-lining up to 4 MB of memory per node per 28-day interval. Further, the described approach was found to detect 90% of the UEs prevented with at least 24 hours before the predicted occurrence of the UEs, and all UEs prevented with at least one hour before the predicted occurrence of the UEs, thus allowing sufficient time for action to be taken by the system.

Exemplary Operating Environment

Figure 7:
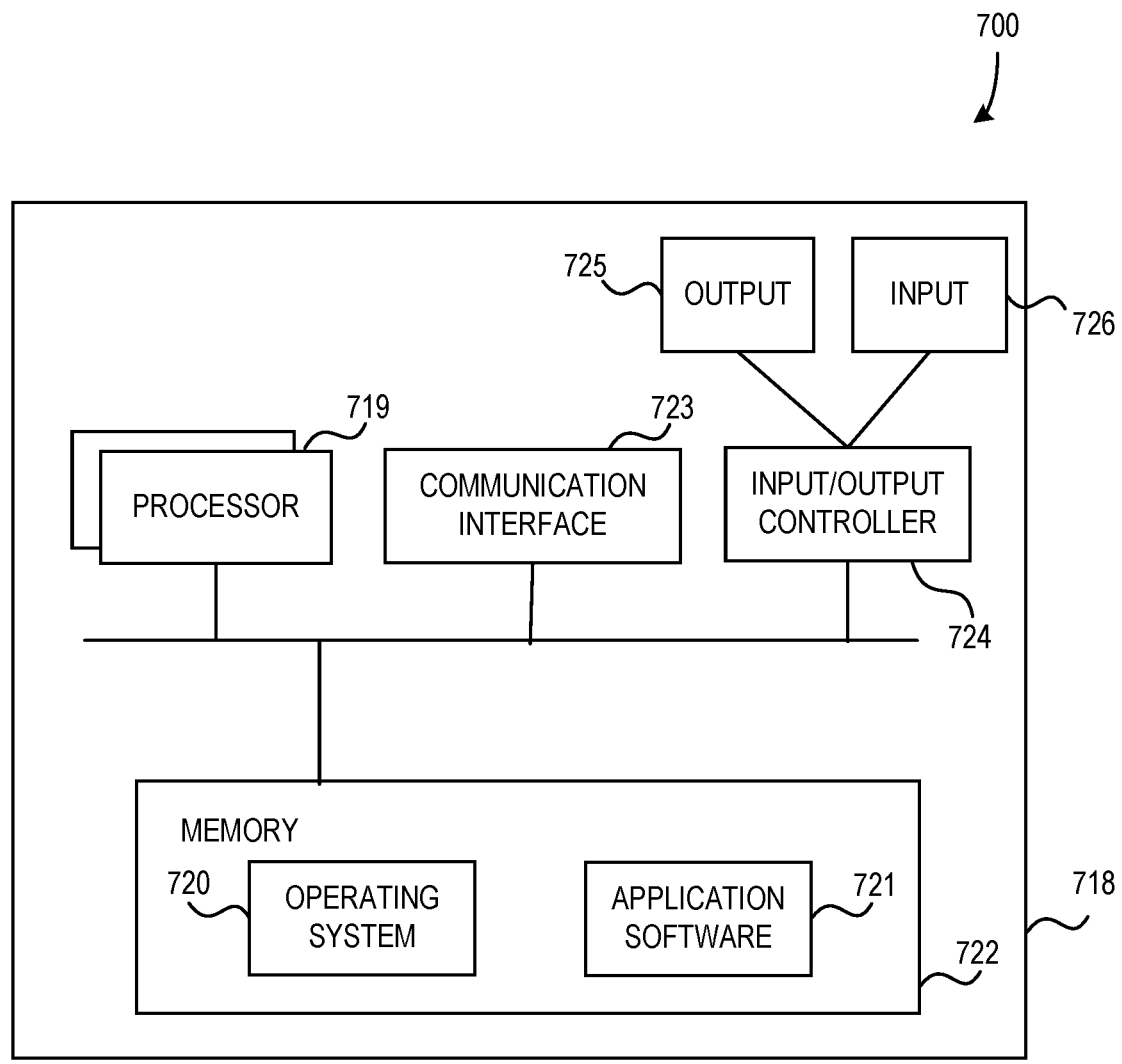
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, training and using a UE prediction model based on telemetry error data described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor; and at least one memory comprising computer program code, the at least one memory and the computer program code configured to, with the at least one processor, cause the at least one processor to: generate a set of uncorrectable error (UE) state labels based on a first set of collected telemetry data, wherein each UE state label references a UE event and telemetry data of a time interval prior to the referenced UE event; generate a set of non-UE state labels based on the collected telemetry data, wherein each non-UE state label references a correctable error (CE) event and telemetry data of a time interval prior to the referenced CE event that does not include a UE event; extract statistical features from telemetry data of the set of UE state labels and from telemetry data of the set of non-UE state labels; train a UE state prediction model using the set of UE state labels, the set of non-UE state labels, and the extracted statistical features; obtain a second set of collected telemetry data; predict a UE event based on the second set of collected telemetry data using the trained UE state prediction model, wherein the predicted UE event is associated with a memory page of a system; and perform a preventative operation on the memory page of the system, whereby the predicted UE event is prevented from occurring.

An example computerized method comprises generating, by a processor, a set of uncorrectable error (UE) state labels based on a first set of collected telemetry data, wherein each UE state label references a UE event and telemetry data of a time interval prior to the referenced UE event; generating, by the processor, a set of non-UE state labels based on the collected telemetry data, wherein each non-UE state label references a correctable error (CE) event and telemetry data of a time interval prior to the referenced CE event that does not include a UE event; extracting, by the processor, statistical features from telemetry data of the set of UE state labels and from telemetry data of the set of non-UE state labels; training, by the processor, a UE state prediction model using the set of UE state labels, the set of non-UE state labels, and the extracted statistical features; obtaining, by the processor, a second set of collected telemetry data; predicting, by the processor, a UE event using the trained UE state prediction model, wherein the predicted UE event is associated with a memory page of a system; and performing, by the processor, a preventative operation on the memory page of the system, whereby the predicted UE event is prevented from occurring.

One or more computer storage media having computer-executable instructions that, upon execution by a processor, cause the processor to at least: generate a set of uncorrectable error (UE) state labels based on a first set of collected telemetry data, wherein each UE state label references a UE event and telemetry data of a time interval prior to the referenced UE event; generate a set of non-UE state labels based on the collected telemetry data, wherein each non-UE state label references a correctable error (CE) event and telemetry data of a time interval prior to the referenced CE event that does not include a UE event; extract statistical features from telemetry data of the set of UE state labels and from telemetry data of the set of non-UE state labels; train a UE state prediction model using the set of UE state labels, the set of non-UE state labels, and the extracted statistical features; obtain a second set of collected telemetry data; predict a UE event using the trained UE state prediction model, wherein the predicted UE event is associated with a memory page of a system; and perform a preventative operation on the memory page of the system, whereby the predicted UE event is prevented from occurring.

Alternatively, or in addition to the other examples described herein, examples include any combination of the following:
   wherein extracting the statistical features includes: extracting statistical features associated with UE state labels and non-UE state labels based on a plurality of different time intervals; and extracting statistical features associated with UE state labels and non-UE state labels based on a plurality of different memory hierarchy levels, wherein the plurality of memory hierarchy levels includes at least one of the following: memory page levels, memory row levels, or node levels.
   wherein training the UE state prediction model includes training the UE state prediction model to predict UE events associated with the plurality of different memory hierarchy levels using the extracted statistical features associated with the plurality of different memory hierarchy levels; and wherein performing the preventative operation on the memory page of the system further includes performing a preventative operation based on a memory hierarchy level with which the predicted UE event is associated.
   wherein the telemetry data of the time interval prior to the referenced UE event of each UE state label excludes telemetry data of a sub-interval immediately before the referenced UE event, wherein the sub-interval is of an error prevention interval length.

wherein the error prevention interval length is one hour, whereby the UE state prediction model is trained to predict UE events that are likely to occur in greater than or equal to one hour.

wherein training the UE state prediction model further includes: forming a set of training data based on the set of UE state labels, the set of non-UE state labels, and the extracted statistical features; dividing the set of training data into a training subset and a testing subset, wherein data of the training subset and data of the testing subset include exclusive node data; training a ML model using the training subset; and evaluating the trained ML model using the testing subset, whereby the trained UE state prediction model is based on a version of the trained ML model that meets evaluation requirements.

wherein training the UE state prediction model further includes: selecting a subset of extracted features with high average information gain based on training the ML model; extracting the selected subset of features from the testing subset; and wherein evaluating the trained ML model includes evaluating the trained ML model using the selected subset of features from the testing subset.

wherein the UE state prediction model is trained with a bias toward high recall when predicting UE events.

wherein the preventative operation performed on the memory page of the system includes off-lining the memory page; and wherein a limit is defined for a maximum quantity of memory that can be off-lined per node using preventative operations.

Any range or device value given herein may be extended or altered without losing the effect sought, as will be apparent to the skilled person.

While no personally identifiable information is tracked by aspects of the disclosure, examples have been described with reference to data monitored and/or collected from the users. The collected data includes only hardware-based data and not personal data of users. Engineers and others that work with or use the described systems and/or methods are shielded from accessing any personal user data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for generating, by a processor, a set of uncorrectable error (UE) state labels based on a first set of collected telemetry data, wherein each UE state label references a UE event and telemetry data of a time interval prior to the referenced UE event; exemplary means for generating, by the processor, a set of non-UE state labels based on the collected telemetry data, wherein each non-UE state label references a correctable error (CE) event and telemetry data of a time interval prior to the referenced CE event that does not include a UE event; exemplary means for extracting, by the processor, statistical features from telemetry data of the set of UE state labels and from telemetry data of the set of non-UE state labels; exemplary means for training, by the processor, a UE state prediction model using the set of UE state labels, the set of non-UE state labels, and the extracted statistical features; exemplary means for obtaining, by the processor, a second set of collected telemetry data; exemplary means for predicting, by the processor, a UE event using the trained UE state prediction model, wherein the predicted UE event is associated with a memory page of a system; and exemplary means for performing, by the processor, a preventative operation on the memory page of the system, whereby the predicted UE event is prevented from occurring.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor; and
    at least one memory comprising computer program code, the at least one memory and the computer program code configured to, with the at least one processor, cause the at least one processor to:
        generate a set of uncorrectable error (UE) state labels based on a first set of collected telemetry data, wherein each UE state label includes a reference to a UE event and telemetry data of a time interval prior to the referenced UE event;
generate a set of non-UE state labels based on the collected telemetry data, wherein each non-UE state label includes a reference to a correctable error (CE) event and telemetry data of a time interval, prior to the referenced CE event, that does not include a UE event;
extract statistical features from telemetry data of the set of UE state labels and from telemetry data of the set of non-UE state labels, wherein extracting the statistical features includes extracting statistical features associated with UE state labels and non-UE state labels based on a plurality of different memory hierarchy levels, wherein the plurality of memory hierarchy levels includes at least one of the following: memory page levels, memory row levels, or node levels;
train a UE state prediction model using the set of UE state labels, the set of non-UE state labels, and the extracted statistical features;
obtain a second set of collected telemetry data;
predict a UE event based on the second set of collected telemetry data using the trained UE state prediction model, wherein the predicted UE event is associated with a memory page of a system; and
perform a preventative operation on the memory page of the system, whereby the predicted UE event is prevented from occurring.

2. The system of claim 1, wherein extracting the statistical features includes:
extracting statistical features associated with UE state labels and non-UE state labels based on a plurality of different time intervals; andextracting statistical features associated with UE state labels and non-UE state labels based on a plurality of different memory hierarchy levels, wherein the plurality of memory hierarchy levels includes at least one of the following: memory page levels, memory row levels, or node levels.

3. The system of claim 2, wherein:
training the UE state prediction model includes training the UE state prediction model to predict UE events associated with the plurality of different memory hierarchy levels using the extracted statistical features associated with the plurality of different memory hierarchy levels; and
wherein-performing the preventative operation on the memory page of the system further includes performing a preventative operation based on a memory hierarchy level with which the predicted UE event is associated.

4. The system of claim 1, wherein the telemetry data of the time interval prior to the referenced UE event of each UE state label excludes telemetry data of a sub-interval immediately before the referenced UE event, wherein the sub-interval is of an error prevention interval length.

5. The system of claim 4, wherein the error prevention interval length is one hour, whereby the UE state prediction model is trained to predict UE events that are likely to occur in greater than or equal to one hour.

6. The system of claim 1, wherein training the UE state prediction model further includes:
forming a set of training data based on the set of UE state labels, the set of non-UE state labels, and the extracted statistical features;
dividing the set of training data into a training subset and a testing subset, wherein data of the training subset and data of the testing subset include exclusive node data;
training a ML model using the training subset; and
evaluating the trained ML model using the testing subset, whereby the trained UE state prediction model is based on a version of the trained ML model that meets evaluation requirements.

7. The system of claim 6, wherein:
training the UE state prediction model further includes:
selecting a subset of extracted features with high average information gain based on training the ML model; and
extracting the selected subset of features from the testing subset; and
wherein-evaluating the trained ML model includes evaluating the trained ML model using the selected subset of features from the testing subset.

8. A computerized method comprising:
generating, by a processor, a set of uncorrectable error (UE) state labels based on a first set of collected telemetry data, wherein each UE state label references-includes a reference to a UE event and telemetry data of a time interval prior to the referenced UE event;
generating, by the processor, a set of non-UE state labels based on the collected telemetry data, wherein each non-UE state label references-includes a reference to a correctable error (CE) event and telemetry data of a time interval, prior to the referenced CE event, that does not include a UE event;
extracting, by the processor, statistical features from telemetry data of the set of UE state labels and from telemetry data of the set of non-UE state labels, wherein extracting the statistical features includes extracting statistical features associated with UE state labels and non-UE state labels based on a plurality of different memory hierarchy levels, wherein the plurality of memory hierarchy levels includes at least one of the following: memory page levels, memory row levels, or node levels;
training, by the processor, a UE state prediction model using the set of UE state labels, the set of non-UE state labels, and the extracted statistical features;
obtaining, by the processor, a second set of collected telemetry data;
predicting, by the processor, a UE event based on the second set of collected telemetry data using the trained UE state prediction model, wherein the predicted UE event is associated with a memory page of a system; and
performing, by the processor, a preventative operation on the memory page of the system, whereby the predicted UE event is prevented from occurring.

9. The computerized method of claim 8, wherein extracting the statistical features includes:
extracting statistical features associated with UE state labels and non-UE state labels based on a plurality of different time intervals; and extracting statistical features associated with UE state labels and non UE state labels based on a plurality of different memory hierarchy levels, wherein the plurality of memory hierarchy levels includes at least one of the following: memory page levels, memory row levels, or node levels.

10. The computerized method of claim 9, wherein:
training the UE state prediction model includes training the UE state prediction model to predict UE events associated with the plurality of different memory hierarchy levels using the extracted statistical features associated with the plurality of different memory hierarchy levels; and wherein-performing the preventative operation on the memory page of the system further includes performing a preventative operation based on a memory hierarchy level with which the predicted UE event is associated.

11. The computerized method of claim 8, wherein the telemetry data of the time interval prior to the referenced UE event of each UE state label excludes telemetry data of a sub-interval immediately before the referenced UE event, wherein the sub-interval is of an error prevention interval length.

12. The computerized method of claim 11, wherein the error prevention interval length is one hour, whereby the UE state prediction model is trained to predict UE events that are likely to occur in greater than or equal to one hour.

13. The computerized method of claim 8, wherein training the UE state prediction model further includes:
forming a set of training data based on the set of UE state labels, the set of non-UE state labels, and the extracted statistical features;
dividing the set of training data into a training subset and a testing subset, wherein data of the training subset and data of the testing subset include exclusive node data;
training a ML model using the training subset; and
evaluating the trained ML model using the testing subset, whereby the trained UE state prediction model is based on a version of the trained ML model that meets evaluation requirements.

14. The computerized method of claim 13, wherein:
training the UE state prediction model further includes:
selecting a subset of extracted features with high average information gain based on training the ML model; and
extracting the selected subset of features from the testing subset; and
wherein evaluating the trained ML model includes evaluating the trained ML model using the selected subset of features from the testing subset.

15. One or more computer storage media having computer-executable instructions that, upon execution by a processor, cause the processor to at least:
generate a set of uncorrectable error (UE) state labels based on a first set of collected telemetry data, wherein each UE state label references includes a reference to a UE event and telemetry data of a time interval prior to the referenced UE event;
generate a set of non-UE state labels based on the collected telemetry data, wherein each non-UE state label references-includes a reference to a correctable error (CE) event and telemetry data of a time interval, prior to the referenced CE event, that does not include a UE event;
extract statistical features from telemetry data of the set of UE state labels and from telemetry data of the set of non-UE state labels, wherein extracting the statistical features includes extracting statistical features associated with UE state labels and non-UE state labels based on a plurality of different memory hierarchy levels, wherein the plurality of memory hierarchy levels includes at least one of the following: memory page levels, memory row levels, or node levels;
train a UE state prediction model using the set of UE state labels, the set of non-UE state labels, and the extracted statistical features;
obtain a second set of collected telemetry data;
predict a UE event based on the second set of collected telemetry data using the trained UE state prediction model, wherein the predicted UE event is associated with a memory page of a system; and
perform a preventative operation on the memory page of the system, whereby the predicted UE event is prevented from occurring.

16. The one or more computer storage media of claim 15, wherein extracting the statistical features includes:
extracting statistical features associated with UE state labels and non-UE state labels based on a plurality of different time intervals; and extracting statistical features associated with UE state labels and non UE state labels based on a plurality of different memory hierarchy levels, wherein the plurality of memory hierarchy levels includes at least one of the following: memory page levels, memory row levels, or node levels.

17. The one or more computer storage media of claim 16, wherein:
training the UE state prediction model includes training the UE state prediction model to predict UE events associated with the plurality of different memory hierarchy levels using the extracted statistical features associated with the plurality of different memory hierarchy levels; and
wherein performing the preventative operation on the memory page of the system further includes performing a preventative operation based on a memory hierarchy level with which the predicted UE event is associated.

18. The one or more computer storage media of claim 15, wherein the telemetry data of the time interval prior to the referenced UE event of each UE state label excludes telemetry data of a sub-interval immediately before the referenced UE event, wherein the sub-interval is of an error prevention interval length.

19. The one or more computer storage media of claim 15, wherein training the UE state prediction model further includes:
forming a set of training data based on the set of UE state labels, the set of non-UE state labels, and the extracted statistical features;
dividing the set of training data into a training subset and a testing subset, wherein data of the training subset and data of the testing subset include exclusive node data;
training a ML model using the training subset; and
evaluating the trained ML model using the testing subset, whereby the trained UE state prediction model is based on a version of the trained ML model that meets evaluation requirements.

20. The one or more computer storage media of claim 19, wherein:
training the UE state prediction model further includes:
selecting a subset of extracted features with high average information gain based on training the ML model; and
extracting the selected subset of features from the testing subset; and
wherein-evaluating the trained ML model includes evaluating the trained ML model using the selected subset of features from the testing subset.

* * * * *